US006975989B2

(12) United States Patent
Sasaki

(10) Patent No.: US 6,975,989 B2
(45) Date of Patent: Dec. 13, 2005

(54) TEXT TO SPEECH SYNTHESIZER WITH FACIAL CHARACTER READING ASSIGNMENT UNIT

(75) Inventor: Hiroshi Sasaki, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 733 days.

(21) Appl. No.: 09/964,428

(22) Filed: Sep. 28, 2001

(65) Prior Publication Data

US 2002/0184028 A1 Dec. 5, 2002

(30) Foreign Application Priority Data

Mar. 13, 2001 (JP) ....................................... 2001-069588

(51) Int. Cl.[7] ......................... G10L 13/08; G10L 13/00; G06F 17/27

(52) U.S. Cl. ............................ 704/260; 704/258; 704/9

(58) Field of Search ................................ 704/260, 258, 704/9

(56) References Cited

U.S. PATENT DOCUMENTS

| | | | | | |
|---|---|---|---|---|---|
| 5,802,482 | A | * | 9/1998 | Sun | 704/8 |
| 5,812,126 | A | * | 9/1998 | Richardson et al. | 715/741 |
| 6,157,905 | A | * | 12/2000 | Powell | 704/2 |
| 6,453,294 | B1 | * | 9/2002 | Dutta et al. | 704/270.1 |
| 2001/0029455 | A1 | * | 10/2001 | Chin et al. | 704/277 |
| 2001/0049596 | A1 | * | 12/2001 | Lavine et al. | 704/9 |
| 2002/0007276 | A1 | * | 1/2002 | Rosenblatt et al. | 704/260 |
| 2002/0194006 | A1 | * | 12/2002 | Challapali | 704/276 |
| 2003/0023425 | A1 | * | 1/2003 | Pentheroudakis et al. | 704/9 |

FOREIGN PATENT DOCUMENTS

JP 11-305987 11/1999

OTHER PUBLICATIONS

David Kurlander, Tim Skelly, David Salesin. "Comic Chat", Aug. 1996 Proceedings of the 23rd annual conference on Computer graphics and interactive techniques.*

* cited by examiner

*Primary Examiner*—David L. Ometz
*Assistant Examiner*—Matthew J Sked
(74) *Attorney, Agent, or Firm*—Rabin & Berdo, P.C.

(57) ABSTRACT

There is provided a text analyzer for analyzing Japanese text data, a facial character reading assignment unit for assigning facial character readings to character string portions of text analysis results determined to correspond to facial characters, and a speech synthesizer for outputting synthesized speech based on the analysis results of the text analyzer. The facial character reading assignment unit is constituted by a facial character determining unit for determining whether or not a symbol is a symbol constituting a facial character using an outline symbol table, a characteristic extraction unit for extracting characteristic symbols used in facial characters from character strings determined to be facial characters, and a reading selection unit for outputting readings allotted to the extracted reading numbers. Here, readings are assigned to the facial character strings according to the number of times characteristic symbols appear in facial characters.

6 Claims, 16 Drawing Sheets

CONFIGURATION OF THE FACIAL CHARACTER READING ASSIGNMENT UNIT OF THE FIRST EMBODIMENT

OVERALL CONFIGURATION OF TEXT TO SPEECH SYNTHESIZER

CONFIGURATION OF THE FACIAL CHARACTER READING ASSIGNMENT UNIT OF THE FIRST EMBODIMENT

FLOW OF PROCESSING FOR FACIAL CHARACTER DETERMINING UNIT

PROCESSING FLOW FOR CHARACTERISTIC EXTRACTION UNIT

EXAMPLE OF TEXT DATA PASSED OVER TO READING ASSIGNMENT UNIT

EXAMPLE OUTPUT OF FACIAL CHARACTER DETERMINING UNIT

VIEW OF CONFIGURATION OF FACIAL CHARABTER READING ASSIGNMENT UNIT OF THE SECOND EMBODIMENT

VIEW OF CONFIGURATION OF CHARACTERISTIC EXTRACTION UNIT

OUTLINE OF VECTOR TABLE

EXAMPLE OF RESULTS OF FACIAL CHARACTER DETERMINATION

EXAMPLE OF FREQUENCY VECTORS

VIEW OF CONFIGURATION OF FACIAL CHARACTER READING ASSIGNMENT UNIT OF THIRD EMBODIMENT

VIEW OF CONFIGURATION OF CHARACTERISTIC EXTRACTION UNIT

EXAMPLE VECTOR TABLE

EXAMPLE OF FACIAL CHARACTER DETERMINATION PROCESSING RESULTS

EXAMPLE OF FREQUENCY VECTOR

EXAMPLE OF FREQUENCY VECTOR AFTER SMOOTHING

EXAMPLE OF SELECTED TYPICAL VECTOR

VIEW DESCRIBING RELATED ART

TEXT TO SPEECH SYNTHESIZER WITH FACIAL CHARACTER READING ASSIGNMENT UNIT

The present invention relates to a text to speech synthesizer capable of reading out text aloud for exchanging information such as e-mails and networked news articles as synthesized speech.

BACKGROUND OF THE INVENTION

With the rapid expansion in the number of people using the internet that has come about in recent years, portable information terminals such as personal computers, portable telephones, PDA's and pagers, etc., have rapidly become widespread as ways of connecting to the internet both in business, at home, and in schools, etc. One reason for this is the existence of message exchange systems such as e-mail and internet news systems, etc. In recent years, new kinds of message exchange systems that integrate various message systems such as systems that convert messages (such as e-mail) into speech for transfer to a telephone, systems that convert messages into speech at a terminal which is then read out, systems where notification of the arrival of an e-mail is outputted to a pager in the possession of the user of the destination, and systems where image information from a fax machine is transmitted as multimedia e-mail with information terminals have recently started to appear. These services centering on messages such as e-mail and speech synthesis have brought about a further increase in users.

An essential function of such message exchange systems is to be able to read out e-mail and networked news on a telephone. However, such e-mail and networked news is completed with the intention that a recipient may read this information with the naked eye, and cases where information is included that cannot be converted to speech are common. For example, characters indicating a facial expression (also referred to as pictographs, ascii art and glyphs) can be used in order to convey subtle feelings and facial nuances of the writer in e-mails or networked news.

For example, FIG. 20(*b*) is a view showing an example of a face inputted as a facial expression. Numeral 291 in FIG. 20(*b*) is an example of a typical e-mail face inputted using simple facial characters. In FIG. 20(*b*), numeral 292 represents a facial character made using parenthesis "("and ")", and the symbols "^" and "." and meaning "smile", and numeral 293 is a facial character made from parenthesis "("and ")" and the symbols "_", "" and "." and meaning "sorry!".

When this kind of character string is read out in related text to speech converter systems, the characters are read out one at a time, which means that the feelings of the sender are not conveyed to the recipient.

Related technology for enabling text to speech conversion of facial characters is cited in published unexamined Japanese Patent Application No. Hei. 11-305987. In this reference, "facial expressions" are represented as being "pictographs". The following is a description of technology disclosed in this reference.

FIG. 20 is a view describing related technology disclosed in this document, with FIG. 20(*a*) showing the overall configuration of a text to speech synthesizer 281. The text to speech synthesizer 281 comprises a text input device 282 for receiving text input from outside of the apparatus, a facial character extraction device 283 for searching facial characters from within the input text 287, a facial character reading converter 284 for converting facial characters retrieved in accordance with a facial character reading table 285 into readings, and a speech synthesizer for converting the input text 287 converted by the facial character reading converter 284 into synthesized speech.

Table 1 is a view of the facial character reading table 285.

TABLE 1

| Facial characters | Reading |
|---|---|
| ( ^ · ^ ) | "smile" |
| (_○ _) | "sorry!" |

The facial character reading table 285 is in a format where the "facial character" and the reading when synthesized as speech are held as a single group.

FIG. 20(*b*) shows the text 294 after carrying out conversion of the inputted text 291 and the reading of the facial character.

In the following, a description is given of the operation of the text to speech converter of the related art. When text data is inputted to the text input device 282, the facial character extraction device 283 searches for facial characters by referring to facial character data recorded in the facial character reading table 285. In the example in FIG. 20(*b*), two facial characters, 292 and 293, are retrieved. Next, the facial character reading converter 284 converts locations of the facial characters into readings in accordance with the facial character reading table 285 (refer to table 1) for output as text 294. Finally, the speech synthesizer 286 converts the converted text data 294 into synthesized speech. As a result of the above processing, facial character portions that cannot conventionally be put into the form of speech or are put into speech in the form of symbol names one character at a time can be read out as synthesized speech.

In the related art disclosed in the reference described above, facial character portions can be converted to readings that can be synthesized as speech by providing a table for registering the facial characters and a device for retrieving, extracting and then converting text data from the facial characters.

However, the following problems exist with the related art.

(1) Registration of facial characters puts pressure on resources. Namely, if facial characters to be read out are to be additionally registered, both the table size (amount of memory used) and the load on the search processing increase.

If this is to be added as a listing, this will increase table size (amount of memory used) and increase the load placed on the search processing. This is also linked to increases in production costs in environments where resources are limited such as in portable information terminals.

(2) Facial characters are also created independently by users and their types therefore also continue to increase. According to the related art, there are no means for reading out facial characters other than those recorded in the facial character table in order to provide compatibility with each time the facial characters continue to increase. However, there is also a limit on the number of facial characters that can be recorded due to limits with regards to resources.

SUMMARY OF THE INVENTION

It is the object of the present invention to provide a text to speech synthesizer capable of reading out as yet unknown facial characters in an environment of limited resources while keeping increases in memory size to a minimum.

In order to achieve this, a text to speech synthesizer of the present invention comprises a text analyzer for analyzing Japanese text data, a facial character reading assignment unit for assigning facial character readings to character string portions of text analysis results determined to correspond to facial characters, and a speech synthesizer for outputting synthesized speech based on the analysis results of the text analyzer. The facial character reading assignment unit is constituted by a facial character determining unit for determining whether or not a symbol is a symbol constituting a facial character using an outline symbol table, a characteristic extraction unit for extracting characteristic symbols used in facial characters from character strings determined to be facial characters, and a reading selection unit for outputting readings allotted to the extracted reading numbers and facial character position data. Here, readings are assigned to the facial character strings according to the number of times characteristic symbols appear in facial characters.

DETAILED DESCRIPTION OF THE INVENTION

The following is a description with reference to the drawings of an embodiment of a text to speech synthesizer of this invention. Each drawing is merely shown in a simplified manner to such an extent that the invention may be clearly understood.

First Embodiment

Figure 1:
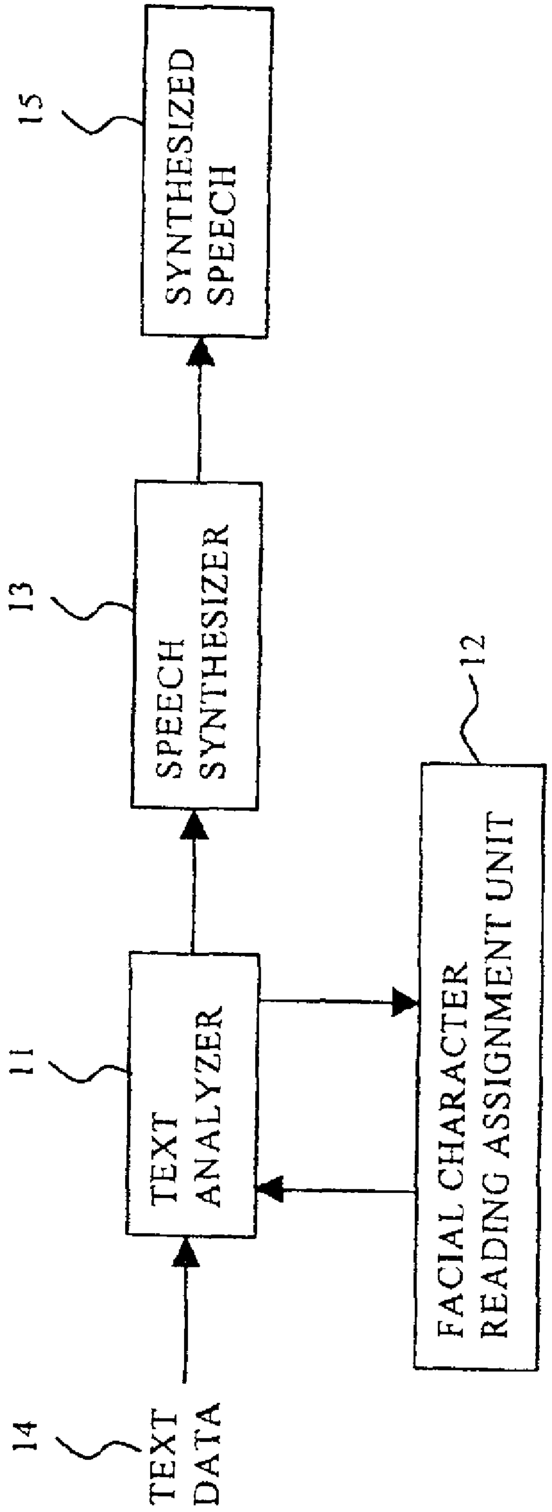
FIG. 1 is a view of an overall configuration for a text to speech synthesizer.

FIG. 1 is a view showing an overall configuration of a text to speech synthesizer of the present invention. The speech synthesizer comprises a text analyzer 11 for performing analysis of Japanese on text data 14, an speech synthesizer 13 for outputting results outputted by the text analyzer and outputting synthesized speech 15, and a facial character reading assignment unit 12 provided at the text analyzer 11, for receiving text data determined to not yet be in the dictionary, determining whether or not facial characters are present, and assigning readings to the facial characters and detecting facial character position when facial characters are present.

Figure 2:
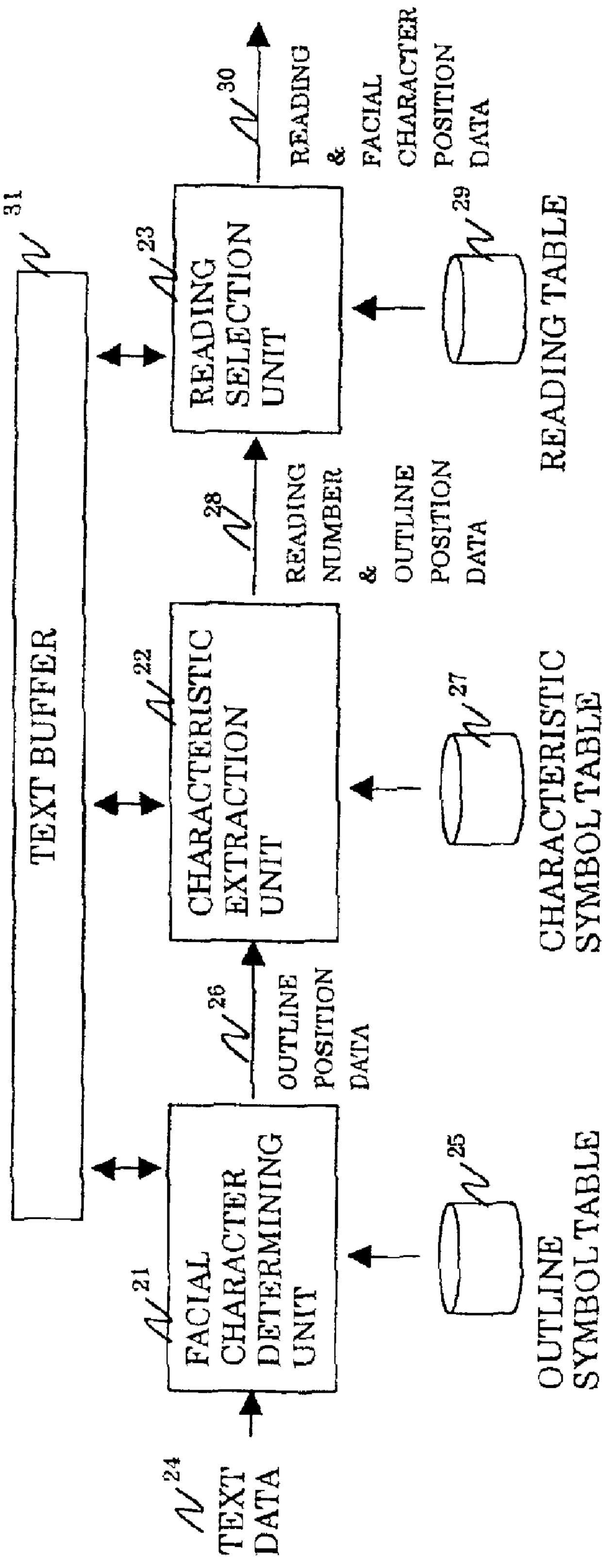
FIG. 2 is a structural view of a facial character reading assignment unit of the first embodiment.

As shown in FIG. 2, the facial character reading assigning unit comprises a text buffer 31 for receiving text data 24 and housing this text data 24, a facial character determining unit 21 for determining whether or not the housed data fulfills facial character conditions using an outline symbol table 25, extracting outline position data 26, and outputting this position, a characteristic extraction unit 22 for extracting symbols used in facial characters from inputted text data and outputting correspondingly assigned reading numbers 28 and outline position data, and a reading selector 23 for receiving the reading numbers and outline position data, and acquiring and outputting readings 30 allotted to the numbers from a reading table 29 and facial character position (that is start and end outline position in text data).

Table 2 shows an example of an outline symbol table, with right outline symbols and left outline symbols respectively being registered.

TABLE 2

| Left outline symbol | Right outline symbol |
|---|---|
| ( | ) |
| { | } |
| [ | ] |

Table 3 shows an example of a characteristic symbol table. Symbols that are most commonly used in locations corresponding to eyes for ten types of facial characters are listed in the left side of the symbol table. Unique numbers (reading numbers) corresponding to readings for cases where these symbols are used for both eyes are listed on the right side of the table. For example, when the symbol "^" is used for both eyes, then this indicates a facial character such as "smile" or "smiley face", to which the reading number 1 is allotted. This means that table size can be suppressed to a greater extent than in the related art as a result of not storing a set of facial character patterns but instead listing just characteristic symbols and separating reading character strings from the characteristic symbol table in a separate table referred to as a reading table.

TABLE 3

| Symbol | Reading number |
|---|---|
| ^ | 1 |
| = | 2 |
| – | 3 |
| T | 4 |
| X | 5 |
| + | 5 |
| ⌒ | 1 |
| ∩ | 1 |
| * | 2 |
| ; | 4 |

Only table offset values exist as reading number at the time of installation. For example, reading number 1 corresponds to the reading (smiling).

TABLE 4

| Reading number | Reading |
|---|---|
| 1 | smiling |
| 2 | whoops |
| 3 | Oh dear |
| 4 | Boo-hoo! |
| 5 | I give up |

The following is a description of the operation of a first embodiment. First, the overall operation of a text to speech synthesizer is described. The text analyzer 11 performs morphological analysis in order to output intermediate language (typically consisting of katakana characters and some synthesis parameters) from the inputted text data. In this morphogical analysis, words are sectioned up using a Japanese dictionary and grammatical rules and word information such as readings and accents for words is assigned. It is necessary to assign readings because facial characters included in the text data are not listed in the dictionary. Text for facial character portions is therefore outputted to the facial character reading assignment unit 12.

Figure 5:
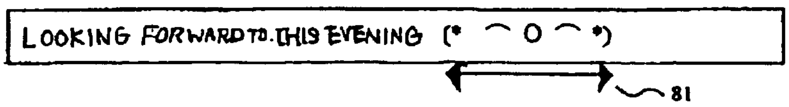
FIG. 5 shows an example of text data to be passed to the reading assignment unit.

An example of this text data is shown in FIG. 5. Here, analysis of the portion "looking forward to this evenings party!" in FIG. 5 is complete. The portion indicated by numeral 81 indicates a location where words cannot be found.

In the following, a description is given with reference to FIG. 2 of the operation of the facial character reading assignment unit of the first embodiment. First, processing of the facial character determining unit is described. When the text data 24 is sent from the text analyzer 11, the facial character determining unit 21 extracts outline symbols using the outline symbol table 25 (refer to table 2) and makes a determination as to whether or not facial characters are present.

This determination is performed in the following manner.

(determination condition 1) The presence of a character string sandwiched by pre-registered outline symbols.

(determination condition 2) The number of characters between the outline symbols being K or less (where K=5).

When the results of the determination are that facial characters are present, the position of the extracted outline symbols (start and end positions) and the text data 24 are sent to the characteristic extraction unit 22.

Specific processing performed by the facial character determining unit 21 is described with reference to the flowchart of FIG. 3.

Figure 3:
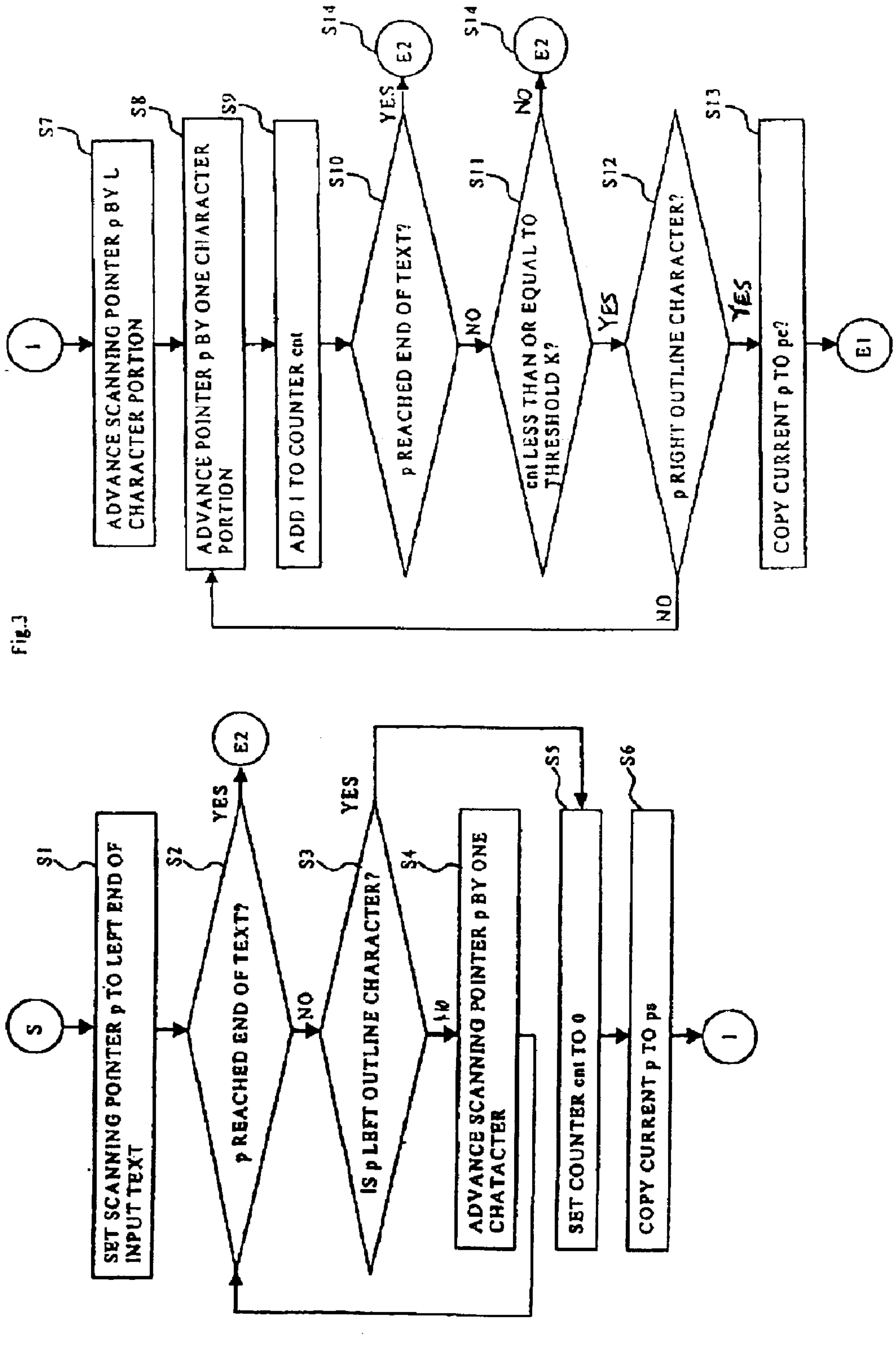
FIG. 3 shows a flowchart of the process of a facial character determining unit.

(A1) Starting from S in FIG. 3, with processing proceeding so as to finish at E1 or E2.

(A2) A scanning pointer p is set to the left end of the inputted text (S1).

(A3) A determination is made as to whether or not a scanning pointer p has reached the right end of the data (S2).

(A4) If the determination results for (S2) are YES, processing proceeds to (A16), and if NO, processing proceeds to (A5).

(A5) A determination is made as to whether a character indicated by the scanning pointer p "is listed as a left outline symbol". If listed, it is taken that facial characters may be present and processing proceeds to (A6). If not listed, the scanning pointer p advances by one character portion, and (A3) is returned to (S3, S4).

(A6) The counter number counter "cnt" is initialized to 0 (S5).

(A7) The current position of the scanning pointer is stored in a left outline character buffer ps (S6).

(A8) The scanning pointer p proceeds to character L (where, for example, L=2). This value L=2 is a value set assuming the case where the content inside the outline is two characters, because the value of L=2 is the minimum value for configuring facial characters (S7). (A9) The scanning pointer p advances by one character portion (S8).

(A10) The character number counter "cnt" has one added (S9).

(A11) A determination is made as to whether or not the scanning pointer p has reached the end of the text.

If the end has been reached, the processing of (A16) is proceeded to. If not, the processing of (A12) is proceeded to (S10).

(A12) A determination is made as to whether or not the character number counter "cnt" is less than or equal to a threshold value K. When less than or equal to K, the processing of (A13) is proceeded to, and when K is exceeded, (A16) is proceeded to. In this processing, facial character determination conditions are based on the assumption that facial characters constructed from a large number of characters are not allowed. The value of K in this case is experimentally taken to be K=5 (S11).

(A13) A determination is made as to whether or not the character pointed to by the scanning pointer p is in the right outline symbol table.

When this character is determined to be a right outline symbol, when progress to (A14) appears unlikely, processing returns to (A9), and extraction of the outline symbols is repeated (S12).

(A14) The value of the current scanning pointer p is stored in the right outline symbol buffer pe (S13).

(A15) If E1 is reached, ps and pe extracted as outline position data (26) together with the text data (24) is sent to the characteristic extraction unit (22).

(A16) If E2 is reached, then the facial character conditions are not fulfilled, and results are sent to the text analyzer (11) without assigning a reading (S14).

The characteristic extraction unit 22 takes outline position data (ps, pe) 26 obtained by the facial character determining unit 21 as input, scans a range between the outline symbols for data stored in the text buffer 31, performs analysis using the characteristic symbol table 27 (refer to FIG. 3), and decides upon a reading number 28, and outputting the reading number and outline position data.

Next, a description is given of a method for extracting symbols used as eyes using the characteristic symbol table 27. In the flow for the basic process, when scanning within the outline symbols in order from the left one character at a time, the number of times symbols listed in the characteristic symbol table appear is counted, symbols for which the number of appearances is two are determined to be eyes, and reading numbers allotted to these symbols are sent to the reading selector 23. For example, with the facial characters (T_T), the symbol T is used twice and is therefore determined to appear as eyes. Further, the same symbol is not always used for both eyes, and the following case is therefore assumed.

When a plurality of eye symbols are used twice.

When both eye symbols are different.

Figure 6:
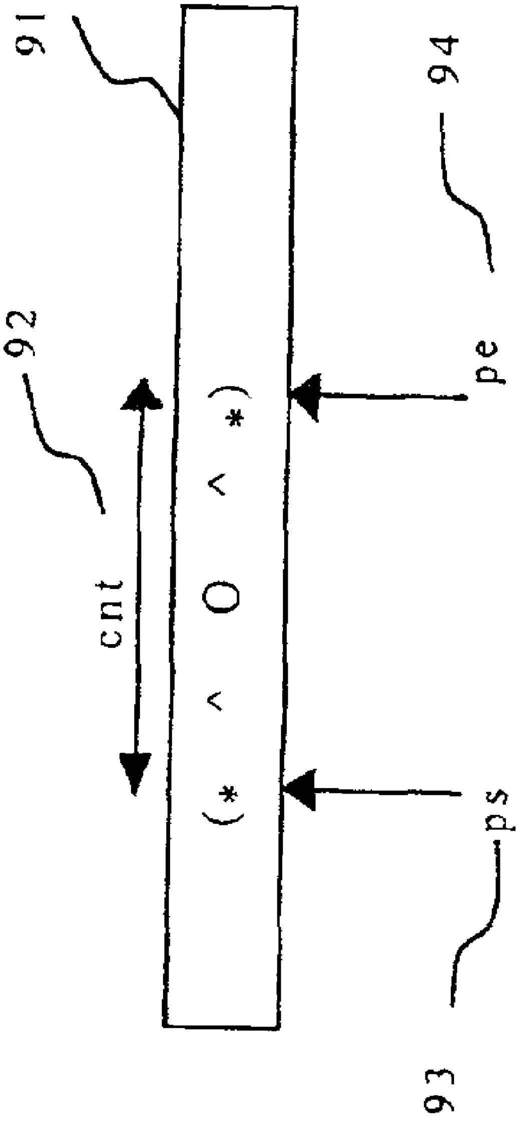
FIG. 6 shows an example of output of the facial character determining unit.

An example of the former case would be, for example, (*^O^*), as shown in FIG. 6. In this case, symbols that are positioned more towards the center of the appearing symbols are determined to be eyes. The reason for this is that structures of the patterns for these facial characters in order from the center towards the outline in the order of "nose or mouth", "eyes", "cheek", "outline" are common so that the maker can allow the recipient to recognize that these characters are facial characters.

A case where both eye symbols are different is, for example, (^o—). In this case, it is necessary to select one of either of the symbols. However, from experience there is probably not a large difference. Therefore, in this embodiment, the symbol for an eye that appears first is determined to be an eye.

Figure 4:
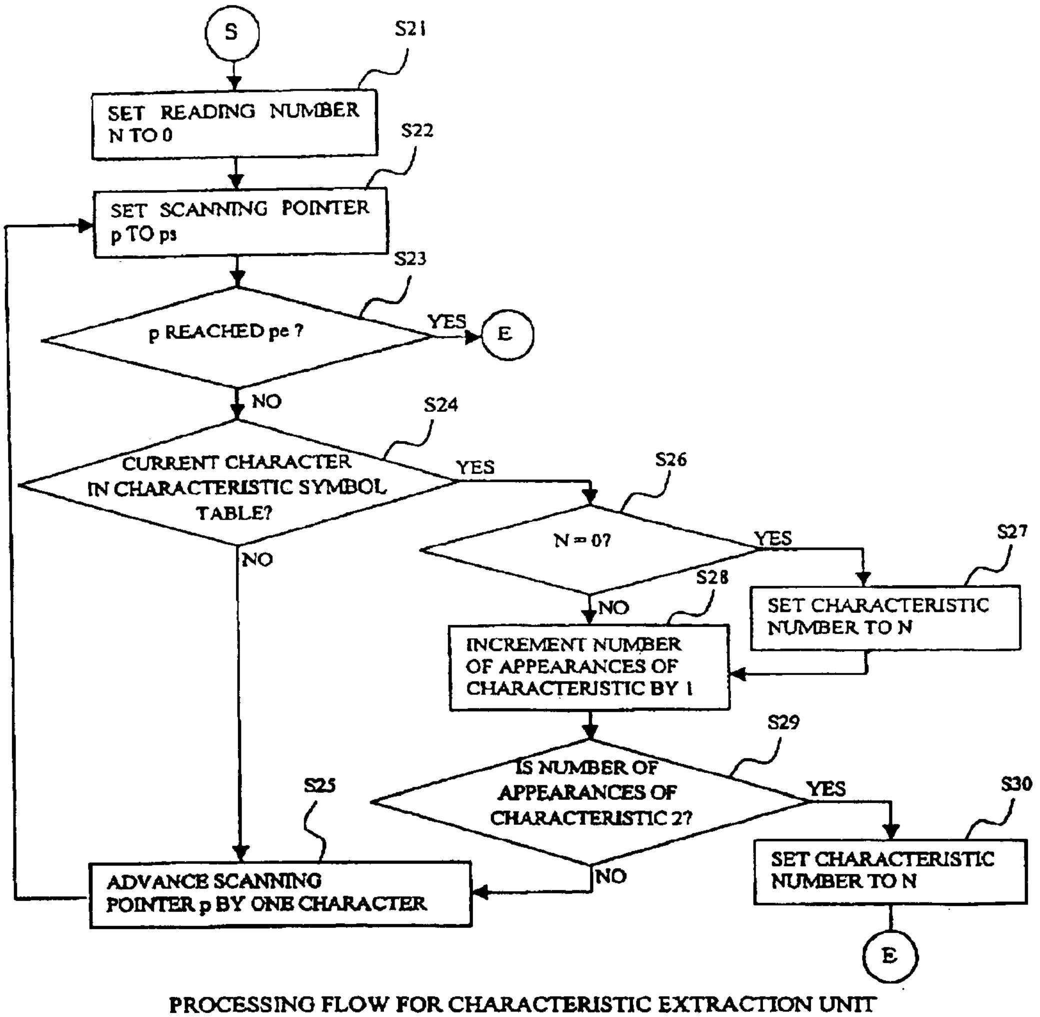
FIG. 4 shows a flowchart of the process of a characteristic extraction unit.

A flowchart of the processing at the characteristic extraction unit is shown in FIG. 4.

(B1) Starting from the position S, with processing proceeding so as to finish at E.

(B2) The reading number N is initialized to 0 (S21).

(B3) The scanning pointer p is set to ps (S22).

(B4) A determination is made as to whether or not the scanning pointer p has reached pe. When this is so, scanning within the facial characters is assumed to have finished and (B10) is proceeded to. When pe has not been reached, it is assumed that the search within the facial characters is still in progress and (B5) is proceeded to (S23).

(B5) A determination is made as to whether or not a character designated by the scanning pointer p is present in the characteristic symbol table 27 (refer to table 3). When a character is present, it is assumed that the characteristic symbols have been extracted and the process proceeds to (B7). When a character is not present in the characteristic symbol table, the process advances to (B6) (S24).

(B6) The scanning pointer advances by one character, and (B4) is advanced to (S25).

(B7) A determination is made as to whether or not the reading number N is still the initial value (=0). When YES, reading numbers corresponding to the extracted characteristic symbol is acquired from the reading table 29 (refer to table 4) and is stored in the reading number buffer N as the symbol appearing first. When NO, (B8) is proceeded to.

(B8) The number of appearances corresponding to the extracted characteristic symbols is incremented by one (S28).

(B9) when the number of appearances corresponding to the extracted characteristic symbols has reached two, the reading number corresponding to the extracted characteristic symbols is stored (S30) and (B10) is proceeded to. When this is not the case, (B6) is returned to, and scanning of the inside of the facial characters is continued.

(B10) The value stored in the reading number buffer N is decided upon as the end for the characteristic extraction unit and sent to the reading selection unit 23.

Table 5 is an example of a table for the number of appearances when the steps of the process during processing of the facial characters shown in FIG. 6 reaches E.

TABLE 5

| Eye symbols | Number of appearances |
|---|---|
| ^ | 2 |
| = | 0 |
| — | 0 |
| T | 0 |
| X | 0 |
| + | 0 |
| ⌒ | 0 |
| ∩ | 0 |
| * | 1 |
| ; | 0 |

This table shows that the symbol "^" appears twice. A description is now given of the reason the number of appearances of the symbol "*" is one. As described above, when a plurality of characteristic symbols are used twice, a method is employed where symbols further to the center are determined to be characteristic symbols. When this is implemented, in addition to counting all of the characteristic symbols within a range from the scanning range ps to pe, processing is also necessary to determine "which symbol (in this case, "*" and "^") is further towards the center?". However, if scanning is carried out one character at a time from ps, the symbols at the center always become "first" and the number of appearances becomes "2". For the above reason, the number of appearances of the symbol "*" in table 5 becomes "1".

When a plurality of eye symbols with a frequency of use of two appear or when the symbols for both eyes are different, as described above, in this embodiment, in the former case, the eye symbols that appear first two times, and in the latter case, the reading number of the eye symbol appearing finally on the left, are selected. However, a method may also be used where an order of priority is assigned to the eye symbols in advance and the symbols are then selected using this order of priority.

The reading selection unit 23 takes the reading number 28 and outline position data outputted from the character extraction unit 22 and the text data 24 as input, uses the reading table 29 (refer to table 4) to acquire reading character strings for the reading numbers, and outputs acquired reading character strings 30 facial character position data (start and end outline position in text data) to the text analyzer 11.

As described above, according to the first embodiment, the following results are anticipated.

(1) Readings can therefore be assigned to locations of facial expressions with a minimum of listings. This means that facial characters can be read out in a proficient manner without unnecessary listing of characters. Further, reading out can also be achieved for facial characters that may come about in the future.

(2) The reading table and the characteristic symbol table are separated and table size can therefore be made small.

Second Embodiment

The overall configuration of the second embodiment is the same as for the first embodiment, with the exception that the internal configuration of the facial character reading assignment unit 12 is different.

Figure 7:
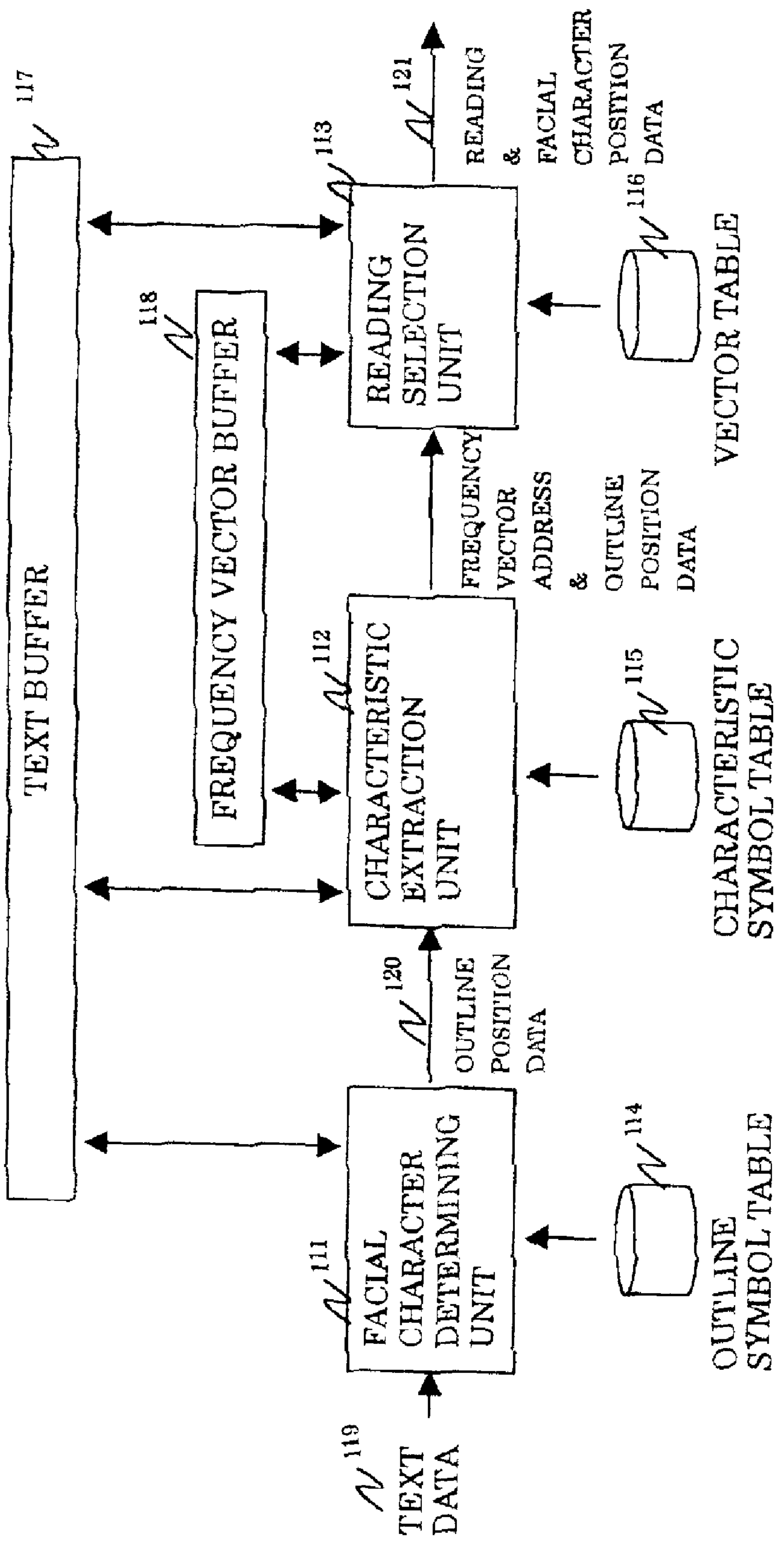
FIG. 7 is a structural view of a facial character reading assignment unit of the second embodiment.

FIG. 7 is a structural view of a facial character reading assignment unit 12 of the second embodiment.

The facial character reading assignment unit of this embodiment comprises a facial character determining unit 111 for receiving text data 119 and extracting outline position data 120 using an outline symbol table 114, a characteristic extraction unit 112 for making frequency vectors using outline position data and a characteristic symbol table 115 and outputting an address of frequency vector and outline position data., a reading selection unit 113 for comparing frequency vectors and typical vectors listed in the vector table 116, selecting typical vectors with a high degree of similarity, and outputting readings 121 corresponding to these typical vectors and facial character position data, a text data buffer 117 for storing the text data, and a frequency vector buffer 118 for storing the frequency vectors.

Figure 8:
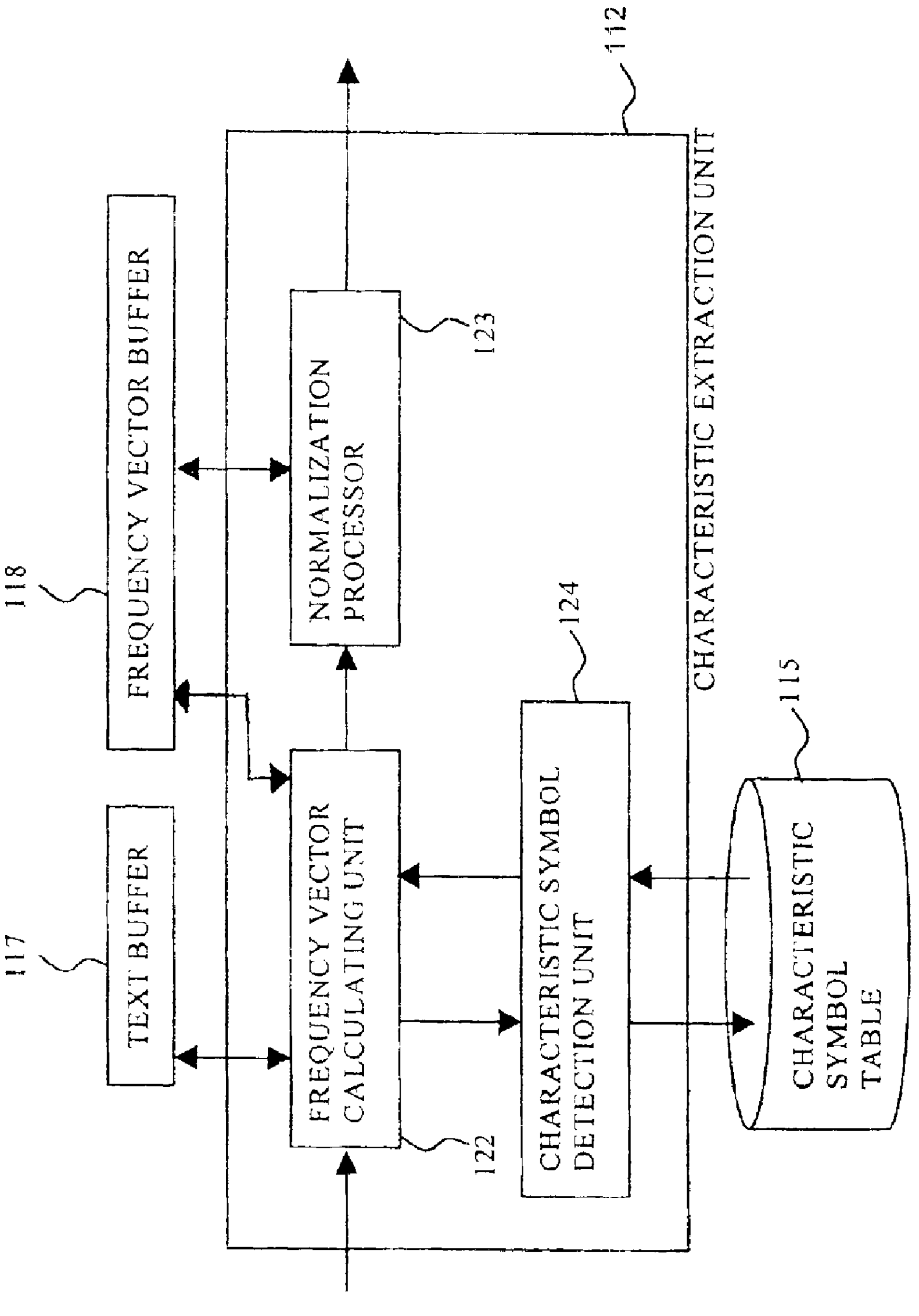
FIG. 8 is a view of a configuration for a characteristic extraction unit.

As shown in FIG. 8, the characteristic extraction unit 112 comprises a frequency vector calculating unit 122 for scanning text data stored in the text buffer 117 over the range of the outline symbols, counting the frequency of occurrence of symbols listed in the characteristic symbol table 115 to obtain frequency vectors, and storing these frequency vectors in the frequency vector buffer 118, a characteristic symbol detection unit 124 for detecting whether or not characters currently being scanned are listed in the characteristic symbol table 115, and a normalization processor 123 for normalizing the frequency vectors.

A description is now given of the tables used in each processing block. Three types of table are used in this embodiment, the outline symbol table 114, the characteristic symbol table 115 and the vector table 116.

The outline symbol table 114 is the same as the outline symbol table shown in table 2, with right outline symbols and left outline symbols being listed, respectively. An example of the characteristic symbol table is shown in table 6. Symbols used in the facial character strings are listed in advance in the characteristic symbol table. In this characteristic symbol table, one record consists of a characteristic symbol and the number of the group to which the characteristic symbol belongs (with a plurality being possible). This means that there is the same number of records as there are symbols listed.

TABLE 6

| Symbol | Group number |
|---|---|
| ˆ | 1 |
| ∩ | 1 |
| ⌒ | 1 |
| へ | 1 |
| o | 2 |
| ● | 2 |
| ○ | 2 |
| · | 2 |
| - | 3 |
| = | 3, 4 |
| — | 3, 4 |
| * | 4 |
| + | 4 |
| X | 4 |
| メ | 4, 5 |
| # | 5 |
| T | 6 |
| ; | 6 |

A description is now given of the groups to which the characteristic symbols belong. A group is a collection of characteristic symbols used in such a manner as to have the same nuance. For example, the characteristic symbols of group number 1 show a group of symbols meaning "smile". Further, the symbol "メ" is often used as a facial character meaning "mistake" and "angry" and therefore belongs to a second group. Further, the groups of symbol tables used are decided by experimentation based on the shape.

Figure 9:
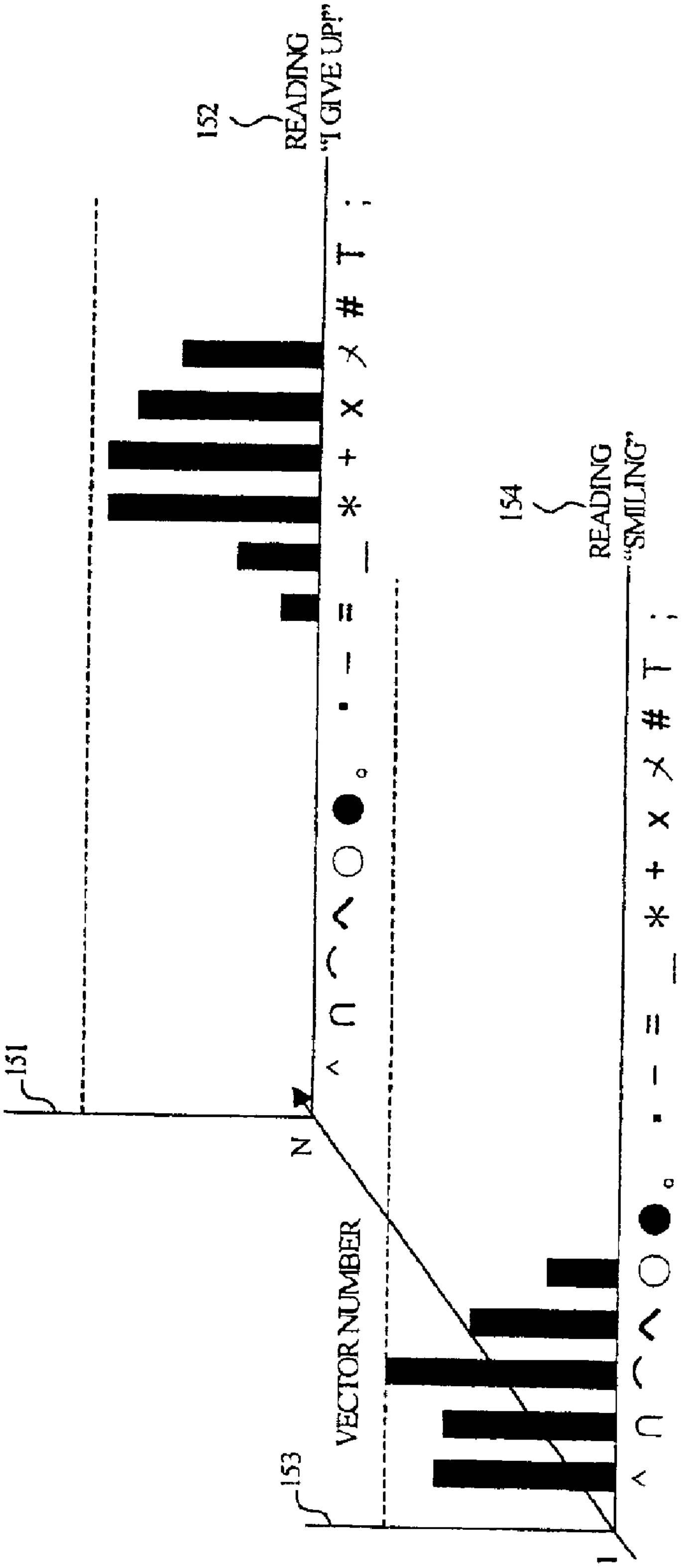
FIG. 9 is a conceptual view of a vector table.

FIG. 9 shows an outline view of a vector table. The vector table is composed of typical vectors made automatically in advance from a large amount of facial character data. Readings are then assigned to each listed vector according to the frequency distribution of the characteristic symbols of the recorded vectors. Numeral 151 and numeral 153 in FIG. 9 are typical vectors showing the nuances of certain facial characters. For example, a typical vector for 151 is a reading of (I give up) for the vector 152 which is a typical vector for the category meaning "mistake". For example, a typical vector for 153 is a reading of (smiling) for the vector 154 which is a typical vector for the category meaning "smile".

The method of making the vector table is now described. The vector table has to be prestored and comprises a plurality of typical vectors, as described previously. These typical vectors are made and entered into a single table. A method for making typical vectors is now described. It is possible to easily make a typical vector using an existing algorithm. In this embodiment, an LBG algorithm is employed. In the following description, the steps from (C3) onwards correspond to the LBG algorithm. It is difficult for a degree of similarity to exist between vectors when frequency vectors are simply used without modification because the character string length of the facial characters is short. As a result, in (C2), an element whereby the number of appearances of all of the characteristic symbols belonging to the same group is added.

(C1) A large amount of facial character data is collected together.

(C2) Characters used in each item of facial character data are then converted to frequency vectors using the characteristic symbol table 115. Specifically, the following procedure is obeyed.

(C2-1) If symbols listed in the characteristic signal table 115 exist within outline symbols, the number of times the symbols appear are set as frequency vectors. However, when frequency vectors are set up for the number of appearances, it is assumed that not only a symbol but also all of the symbols within the group to which the symbol belongs appear when setting up the number of appearances. For example, when "∩" appears within the inputted facial characters, according to the characteristic symbol table (refer to FIG. 6), the symbol belongs to group 1. Therefore, not only is the number of appearances of "∩" increased, but also the number of appearances of all of the symbols "ˆ⌒へ" other than "∩" but belonging to the same group is increased.

(C2-2) The frequency vector obtained in this manner is normalized. This is achieved by dividing the value for each element by the maximum element value for the vector, with the purpose of suppressing variation in the magnitude of the frequency vectors occurring due to the number of facial characters.

(C3) The extracted frequency vector is inputted to an LBG algorithm and a typical vector is outputted. The following is a simple description of the flow when making a typical vector according to the LBG algorithm processing procedure.

(C3-1) The required number of typical vectors and control parameters is set.

(C3-2) An initial centroid C1 is made from the inputted frequency vector. Specifically, the initial centroid C1 is the mean value of all of the frequency vectors.

(C3-3) The centroid is increased by a factor of two (centroid division processing). Specifically, the current centroid Ck (where k is taken to be an integer between 1 and the current centroid number n) makes two centroids Ck and Ck+n using a random vector r (where the number of dimensions of the vector is the same number as the centroid Ck) and a control parameter S (scalar quantity). For example, when the current centroid number is 2, new centroids C1 and C3 are made based on the centroid C1, and new centroids C2 and C4 are then made based on the centroid C2.

Centroids that have been doubled by (C3-4)(C3-3) are arranged in a classified manner and in the most appropriate state (centroid updating process). Specifically, the inputted frequency vectors are subjected to vector quantization using the frequency vectors made using the current centroid (C2), and the centroid is repeatedly corrected until the quantization error Ei during this time is smaller than a preset threshold value E.

The process is then complete when the current centroid number reaches the final typical vector number N set using (C3-5)(C3-1). If the current centroid number is less than N, the process (C3-3) is returned to.

(C4) Readings are assigned to typical vectors made in the processing up to this point.

Specifically, the following procedure is obeyed.

All of the frequency vectors made in (C4-1)(C2) are classified using the typical vectors obtained in (C3).

(C4-2) A reading for a characteristic vector that is most similar to the typical vector, from within the classified characteristic vectors, is taken as the reading for the typical vector assigned to this category, at the category assigned to this typical vector, for all typical vectors.

The operation of the facial character determining unit is now described. Characters are scanned from the left end using the outline symbol table shown in table 2 and an outline position is extracted. However, an upper limit is set on the number of characters between the outline symbols and facial characters are therefore assumed to be character strings of a length that is the number of facial characters typically used. (the specific processing procedure is the same as for the first embodiment).

Figure 10:
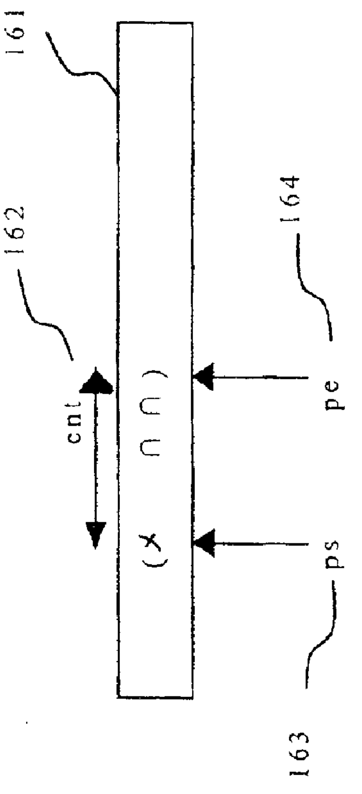
FIG. 10 shows an example of facial character determination processing results.

An example of results of facial character determination processing is shown in FIG. 10. In FIG. 10, the position ps (163) of the left outline symbol and the position pe (164) of the right outline symbol are extracted. This text data is stored in the text buffer 117 and ps=left outline symbol address information and pe=right outline symbol address information are sent to the characteristic extraction unit 112.

The operation of the characteristic extraction unit 112 will now be described. At the characteristic extraction unit frequency vectors are made according to the following procedure and sent to the reading selection unit 113. As described in the vector table making method, in order to resolve the problem regarding shortness of the character string length of the facial characters, in (D1) in the following, an element is executed whereby the number of appearances of all of the characteristic symbols belonging to the same group are operated upon.

(D1) The frequency of symbols within outline symbol position data outputted from the outline character unit and within the inputted facial character data is calculated. Specifically, this is as follows.

(D1-1) The scanning pointer p is aligned with the left outline symbol position Ps extracted using the outline extraction unit.

(D1-2) The following steps are repeated until the scanning pointer p reaches the right outline symbol position Pe extracted by the outline extraction unit.

(D1-3) The characteristic symbol table is searched for the character pointed to by the scanning pointer p.

If the results of the search are that the character is listed, the number of appearances of all of the characteristic symbols belonging to the same group as the characteristic symbol is increased by one.

(D1-4) The scanning pointer p is advanced to the right by one character, and (D1-2) is returned to.

Figure 11:
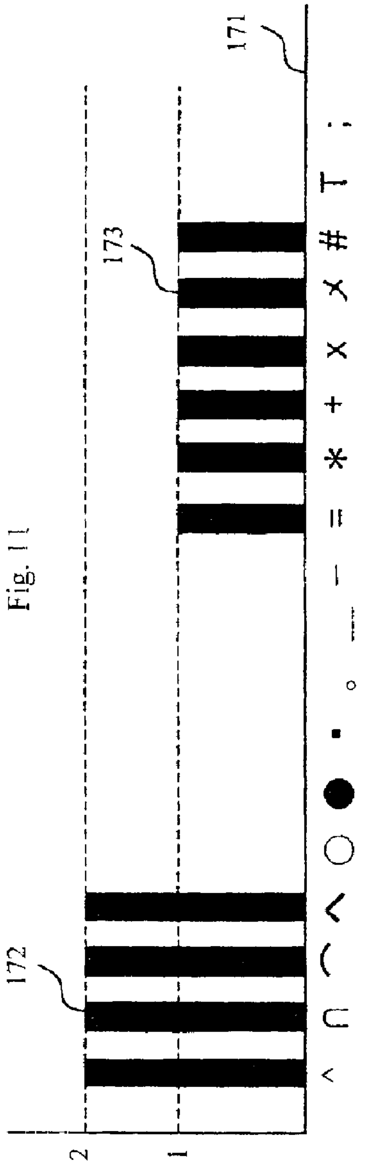
FIG. 11 shows an example of a frequency vector.

An example of the frequency vectors made in the process (D1) is shown in FIG. 11, i.e. frequency vectors made from the character strings of FIG. 10 are shown.

(D2) The frequency vectors made in the processes (D1) are normalized.

The reason for executing this normalization process is as described above. Specifically, each element is divided by the maximum frequency stored in the frequency vector buffer. The frequency vector made in (D2) is taken to have a maximum value of 1 and to have the same shape as in FIG. 11.

(D3) The normalized frequency vector is stored in the frequency vector buffer 118 and this start address and outline position data are sent to the reading selection unit 113.

The operation of the reading selection unit 113 will now be described. At the reading selection unit, readings are acquired from frequency vectors made using the characteristic extraction unit in accordance with the following procedure.

(E1) A typical vector that is most similar to the inputted frequency vector is obtained in the following process.

(E1-1) A counter k is initialized to 1.

(E1-2) The following process is repeated until the counter k reaches the typical vector number M.

(E1-3) An error Ek for the kth typical vector listed in the vector table 116 and the frequency vector outputted from the characteristic extraction unit is calculated. The method of calculating the error Ek can be obtained in accordance with the following equation.

$$Ek = \sum_{i=1}^{n} (Xi - Ck, i)^2 \tag{1}$$

where Xi is the ith element of the inputted frequency vector and Ck, i is the ith element of the kth typical vector.

(E1-4) The counter k is set to k+1, and (E1-2) is returned to.

(E2) A reading allotted to the typical vector selected in (E1) is acquired, and this reading and facial character position data (start and end outline position in text data) are outputted.

Figure 12:
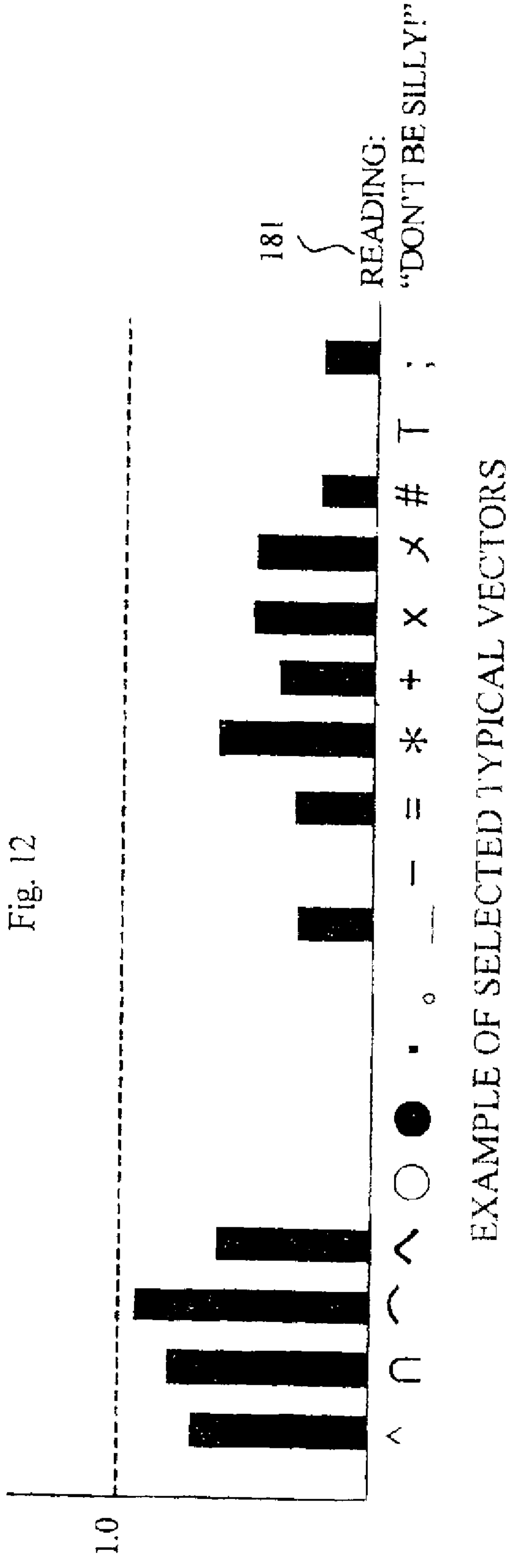
FIG. 12 shows an example of a selected typical vector.

FIG. 12 shows a typical vector determined to be the most similar in FIG. 11. At this typical vector, values are entered at the location of a symbol group meaning “angry” and “mistake” and the symbol group meaning “smile”, and the assigned reading is “Don’t be silly!”.

As described above, according to the second embodiment, combinations of characteristic primitives for inputted facial character data are put into the form of vectors using the number of appearances of characters. Reference vectors for frequency vectors are prepared in advance based on a large amount of facial character data. A reading for a vector made from the inputted data and the most similar typical vector can then be outputted by comparing these items. This means that assignment of readings to facial characters is possible without registering facial character patterns.

Third Embodiment

The overall device configuration is the same as for the first and second embodiments, with the exception that the internal configuration of the facial character reading assignment unit 12 is different.

Figure 13:
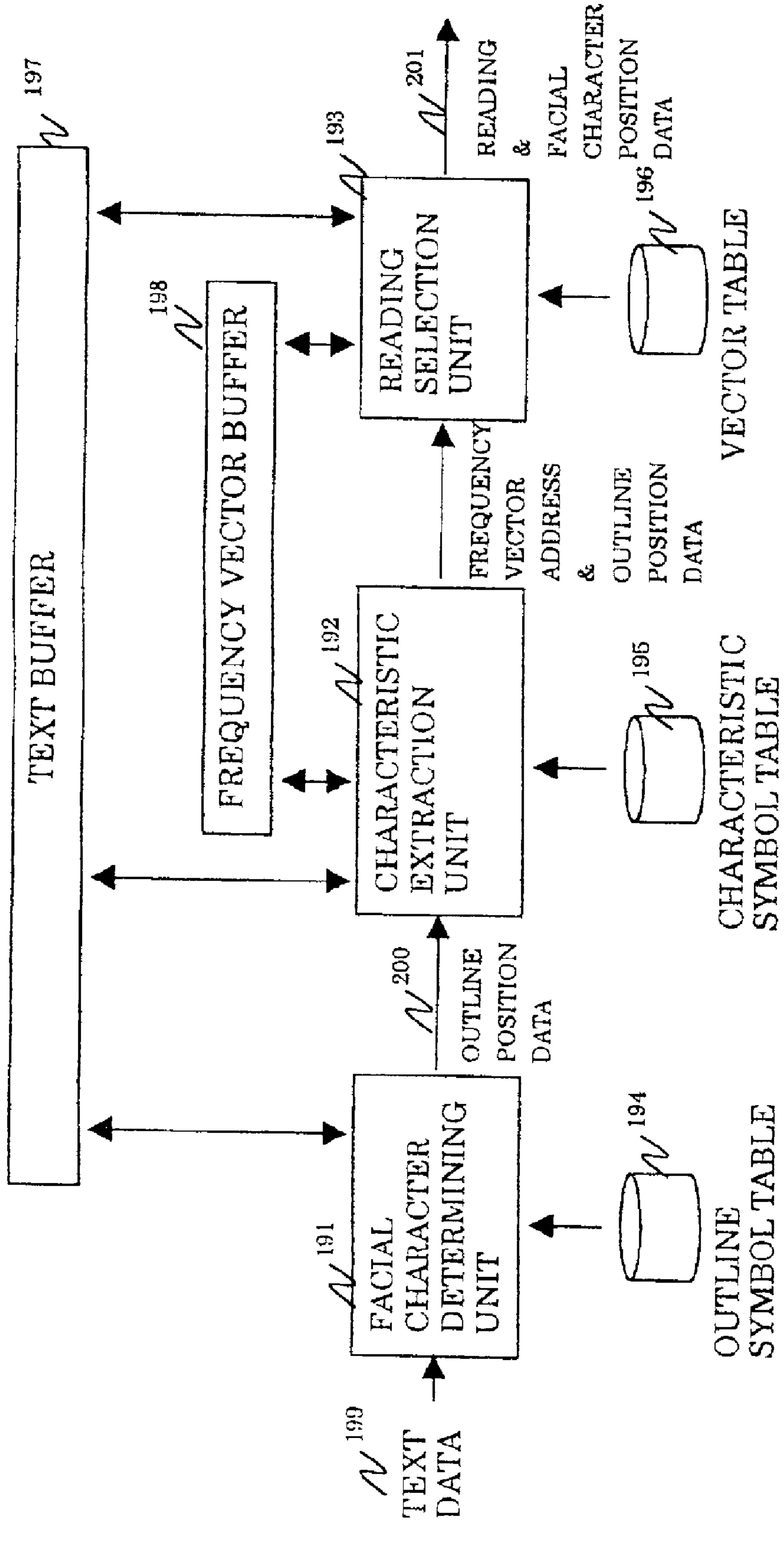
FIG. 13 is a structural view of a facial character reading assignment unit of the third embodiment.

Configurations for the facial characters and assignment unit of this embodiment are now described. These configurations are shown in FIG. 13. The facial character reading assignment unit of this embodiment comprises a facial character determining unit 191 for receiving text data 199 and extracting outline position data 200 using an outline symbol table 194, a characteristic extraction unit 192 for making frequency vectors by receiving outline position data and using a characteristic symbol table 195, a reading selection unit 193 for comparing frequency vectors and typical vectors listed in the vector table 196, selecting typical vectors with a high degree of similarity, and outputting readings 201 corresponding to these selected typical vectors and facial character position data, a text data buffer 197 for storing the text data, and a frequency vector buffer 198 for storing the frequency vectors.

Figure 14:
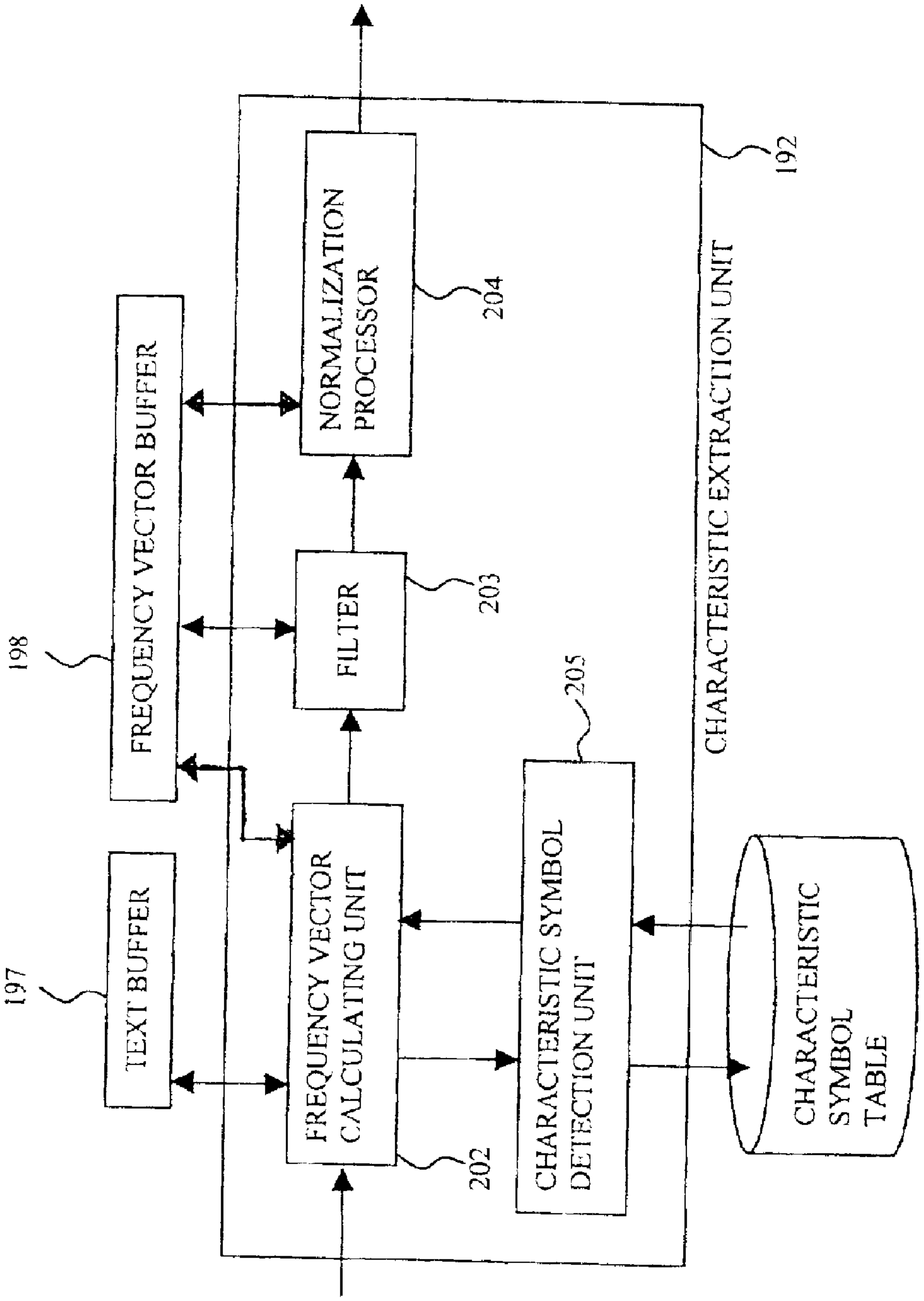
FIG. 14 is a view of a configuration for a characteristic extraction unit.

FIG. 14 is a view showing the details of a configuration for the characteristic extraction unit 192. The characteristic extraction unit 192 comprises a frequency vector calculating unit 202 for scanning text data stored within the text buffer within the range of the outline symbols and storing the number of appearances of certain symbols in the characteristic symbol table in a frequency vector buffer, a characteristic symbol detection unit 205 for searching whether or not symbols stored in the text buffer are listed in the characteristic symbol table, a filter unit 203 for smoothing frequency vectors stored in the frequency vector buffer, and a normalization processor 204 for normalizing frequency vectors.

The following processing is carried out at the filter unit 203 (in this embodiment, n=1).

$$Yi' = \sum_{k=-n}^{n} (n-|k|+1)Yi+k \Big/ \sum_{k=-n}^{n} (n-|k|+1) \qquad (2)$$

where Yi is the value of the ith element of a frequency vector before filtering and Yi' is a value of an ith element after filtering, and n is a variable indicating window size of the filter.

A description is now given of the tables used in each processing block. Three types of table are used in this embodiment, the outline symbol table 194, the characteristic symbol table 195 and the vector table 196.

The outline symbol table is the same as that shown in table 2, with right outline symbols and left outline symbols being listed, respectively.

An example of the characteristic symbol table 195 is shown in table 7. Symbols used in the facial character strings are listed in advance in the characteristic symbol table. This characteristic symbol table lines up characteristic symbols with similar symbol shapes, or characteristic symbols used with similar meanings near to each other. Further, registering of as many symbols that may be used as symbols in facial characters as possible is also preferable from the point of view of providing compatibility with facial characters that may continue to increase thereafter. This table is made through experimentation.

TABLE 7

| Symbol |
| --- |
| ˆ |
| ∩ |
| ⌒ |
| ︿ |
| ○ |
| ● |
| ∘ |
| · |
| - |
| — |
| = |
| * |
| + |
| × |
| メ |
| # |
| T |
| ; |

Figure 15:
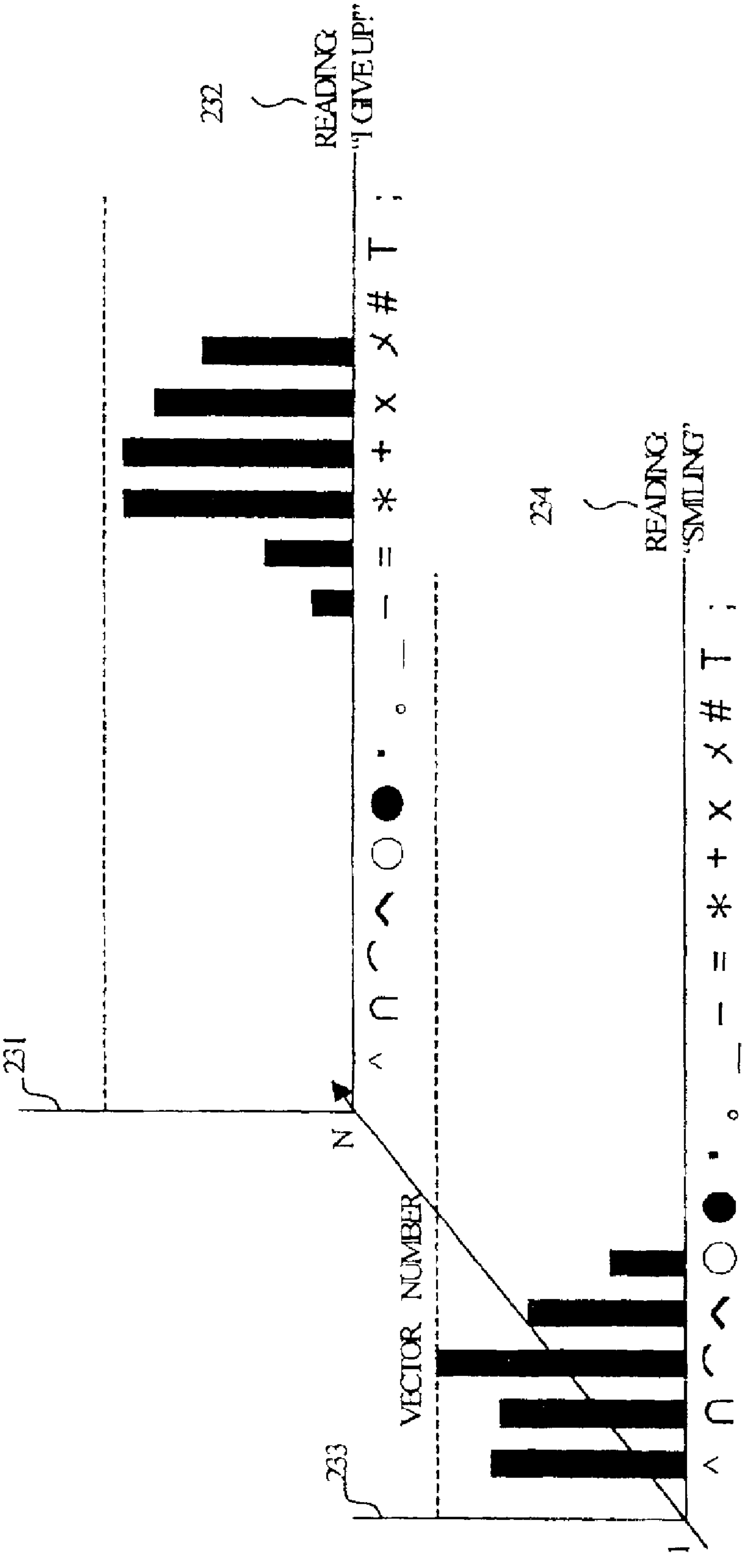
FIG. 15 shows an example of a vector table.

FIG. 15 shows an example of a vector table. The vector table is composed of a plurality of items listed in advance made from a large amount of facial character data. Readings are then assigned to each listed vector according to the frequency distribution of the characteristic symbols of the recorded vectors.

The method of making the vector table is now described. This vector table consists of a plurality of typical vectors. These typical vectors can be made in a straightforward manner using existing algorithms. An LBG algorithm is employed in this embodiment. As described above, it is difficult for a degree of similarity to exist between vectors when frequency vectors are simply used without modification because the character string length of the facial characters is short. As with the method for making a vector table of the second embodiment, in (F2) an element is performed whereby the number of appearances of characteristic symbols included in neighboring element values is operated upon.

(F1) A large amount of facial character data is collected together.

(F2) Characters used in each item of facial character data are then converted to frequency vectors using the characteristic symbol table 195.

Normalization is carried out using the maximum frequency after processing the vector data at the smoothing filter 203 in order to compensate for an insufficient amount of information for the vector data due to the shortness of the number of characters for the facial characters. The smoothing filter updates vector values according to equation (2). The number of appearances of the characteristic symbols for similar shapes lined up next to each other therefore increases due to this processing.

(F3) The extracted frequency vector is inputted to an LBG algorithm and a typical vector is outputted.

The following is a simple description of the flow when making a typical vector according to the LBG algorithm processing procedure.

(F3-1) The required number of typical vectors and control parameters is set.

(F3-2) An initial centroid C1 is made from the inputted frequency vector.

Specifically, the initial centroid C1 is the mean value of all of the frequency vectors.

(F3-3) The centroid is increased by a factor of two (centroid division processing).

Specifically, the current centroid Ck (where k is taken to be an integer between 1 and the current centroid number n) makes two centroids Ck and Ck+n using a random vector r (where the number of dimensions of the vector is the same number as the centroid Ck) and a control parameter S (scalar quantity). For example, when the current centroid number is 2, new centroids C1 and C3 are made based on the centroid C1, and new centroids C2 and C4 are then made based on the centroid C1.

(F3-4) Centroids that have been doubled by processing (F3-3) are arranged in a classified manner and in the most appropriate state (centroid updating process).

Specifically, the inputted frequency vectors are subjected to vector quantization using the current centroid, and the centroid is repeatedly corrected until the quantization error Ei during this time is smaller than a preset threshold value E.

(F3-5) The process is then complete when the current centroid number reaches the final typical vector number N set using processing (F3-1).

If the current centroid number is less than N, then (F3-3) is returned to.

(F4) Readings are assigned to typical vectors made in the processing up to the steps above.

Specifically, the following procedure is obeyed.

(F4-1) All of the frequency vectors made from the inputted facial character data are classified into typical vectors obtained in (F3).

(F4-2) A reading for a characteristic vector that is most similar to the typical vector, from within the classified characteristic vectors, is taken as the reading for the typical vector assigned to this category, at the category assigned to this typical vector, for all typical vectors.

Figure 16:
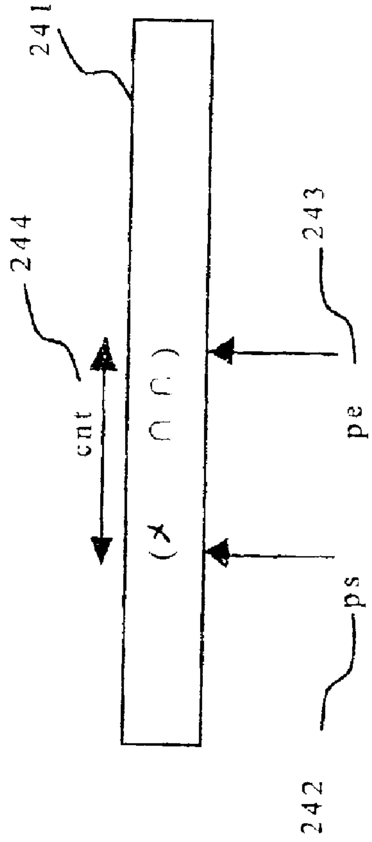
FIG. 16 shows an example of facial character determination results.

The operation of the facial character determining unit is now described. Characters are scanned from the left end using the outline symbol table of table 2 and an outline position is extracted. However, an upper limit is set on the number of characters between the outline symbols and facial characters are therefore assumed to be character strings of a length that is the number of facial characters typically used. An example of results of facial character determination processing is shown in FIG. 16. In FIG. 16, it is determined whether or not the position ps (242) of the left outline symbol and the position pe (243) of the right outline symbol are extracted. Here, ps and pe are then sent to the characteristic extraction unit.

The operation of the characteristic extraction unit will now be described. At the characteristic extraction unit, frequency vectors are made according to the following procedure and sent to the reading selection unit.

(G1) The frequency of symbols within outline symbol position data outputted from the outline extraction unit and within the inputted facial character data is calculated. Specifically, this is as follows.

(G1-1) The scanning pointer p is aligned with the left outline symbol position $p_s$ extracted using the outline extraction unit.

(G1-2) The following steps are repeated until the scanning pointer p reaches the right outline symbol position pe extracted by the outline extraction unit.

(G1-3) The characteristic symbol table is searched for the character pointed to by the scanning pointer p. If the results of the search are that the character is listed, the number of appearances of all of the characteristic symbols is incremented by +1.

(G1-4) The scanning pointer p is advanced to the right by one character, and (G1-2) is returned to.

Figure 17:
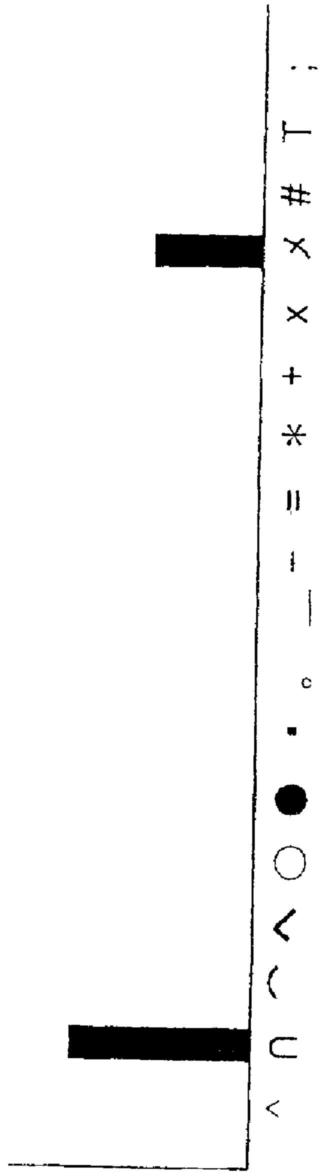
FIG. 17 shows an example of a frequency vector.

An example of a frequency vector made based on FIG. 16 is shown in FIG. 17. It is determined whether or not the symbol "∩" appears two times and the symbol "ﾒ" appears once.

Figure 18:
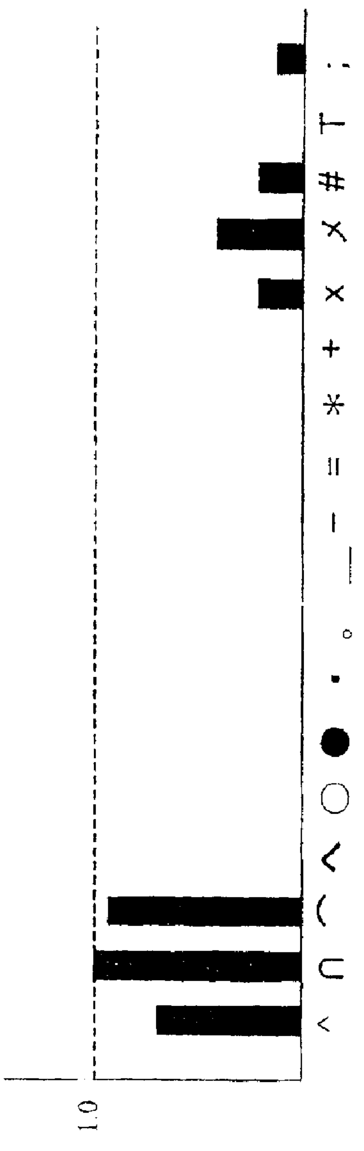
FIG. 18 shows an example of a frequency vector after dim processing.
Figure 19:
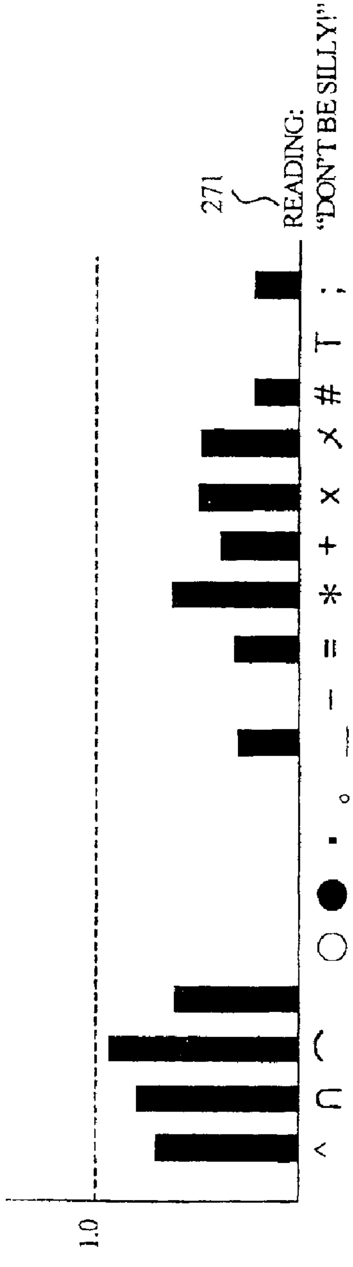
FIG. 19 shows an example of a selected typical vector.
Figure 20A:
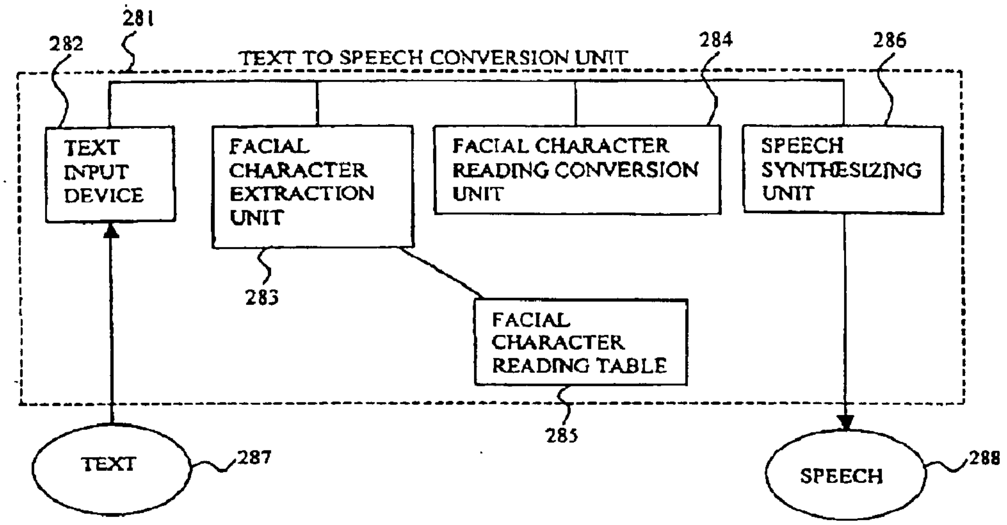
Fig. 20(a) PRIOR ART
FIG. 20 is a view describing the related art.
Figure 20B:
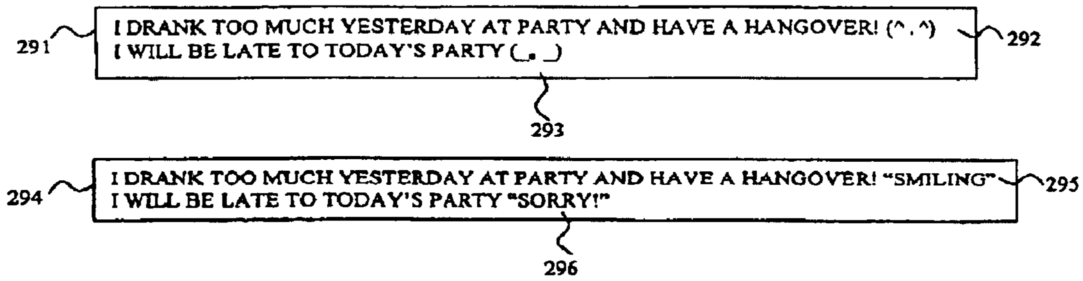
Fig 20(b) PRIOR ART

(G2) Normalization is carried out on the frequency vectors made using the processing in (G1) using a maximum appearance value after subjecting the frequency vectors to filtering. It is difficult for a degree of similarity to exist between vectors when frequency vectors are simply used without modification because the character string length of the facial characters is short. Symbols that are similar in shape are arranged in advance so as to be lined up close to each other. When an arbitrary symbol then appears, the similarity between vectors can also be increased by increasing the number of appearances of surrounding symbols using filtering. FIG. 18 shows the results of subjecting the vectors in FIG. 17 to smoothing processing and to normalization processing. It can therefore be understood that by adding smoothing processing, values appear not just for the symbol "∩" but also for the symbols "^⌒" that are also often used so as to have the same meaning.

(G3) Normalized characteristic vectors and outline position data are sent to the reading selection unit 193.

The operation of the reading selection unit 193 will now be described. At the reading selection unit, readings are acquired from frequency vectors made using the characteristic extraction unit in accordance with the following procedure.

(H1) A typical vector that is most similar to the inputted frequency vector is obtained in the following process.

(H1-1) A counter k is initialized to 1.

(H1-2) The following process is repeated until the counter k reaches the typical vector M.

(H1-3) An error Ek for the kth typical vector listed in the vector table 196 and the frequency vector outputted from the characteristic extraction unit is calculated in accordance with equation (1).

(H1-4) The counter k is set to k+1, and (H1-2) is returned to.

(H2) A reading allotted to the typical vector selected in (H1) is acquired, and this reading and facial character position data (start and end outline position in text data) are outputted.

As described above, according to the third embodiment, combinations of characteristic primitives for inputted facial character data are put into the form of vectors using the number of appearances of characters. A table of reference vectors for frequency vectors is made in advance based on a large amount of facial character data. A reading for a vector made from the inputted data and the most similar typical vector can then be outputted by comparing these items. This means that assignment of readings to facial characters is possible by taking into consideration combinations of characteristic primitives without registering facial character patterns.

Further, the processing of this embodiment only employs simple filtering. This means that both processing speed and mounting efficiency can be improved.

What is claimed is:

1. A text to speech synthesizer, comprising:

a text analyzer for analyzing text data;

a facial character reading assignment unit for assigning facial character readings to character string portions of text analysis results determined to correspond to facial characters; and a speech synthesizer for outputting synthesized speech based on the analysis results of the text analyzer, wherein the facial character reading assignment unit includes a facial character determining unit for determining whether or not a symbol is a symbol constituting a facial character using an outline symbol table, a characteristic extraction unit for extracting characteristic symbols used in facial characters from facial character strings determined to be for the facial characters, and assigning facial characters corresponding to characteristic symbols, using a character symbol table that associates characteristic symbols with particular reading numbers corresponding to the symbol, and a reading selection unit for outputting readings allotted to extracted reading numbers with reference to a reading table that associates the reading numbers with particular readings corresponding thereto, with the readings being allotted to the facial character strings according to the number of appearances of characteristic symbols in the facial characters.

2. The text to speech synthesizer of claim 1, wherein the facial character reading assignment unit decides upon readings for facial characters using the steps of:

(a) scanning the text and detecting a left outline symbol listed in the outline symbol table, (b) detecting a right outline symbol within a range of a prescribed number of characters if a left outline symbol is detected, (c) extracting symbols exhibiting characteristics of eyes from a character string portion encompassed by the left outline symbol and the right outline symbol, and (d) referring to the characteristic symbol table and the reading table, and deciding upon a corresponding facial character reading from readings for characters exhibiting eyes.

3. A text to speech synthesizer, comprising:

a text analyzer for analyzing text data;

a facial character reading assignment unit for assigning facial character readings to character string portions of text analysis results determined to correspond to facial characters; and a speech synthesizer for outputting synthesized speech based on the analysis results of the text analyzer, wherein the facial character reading assignment unit includes a facial character determining unit for determining whether or not a symbol is a symbol constituting a facial character using an outline symbol table, a characteristic extraction unit for extracting, from character strings determined to be facial characters, characteristic symbols used in facial characters, using a characteristic symbol table consisting of characteristic symbols and number of groups the characteristic symbols belong to said characteristic extraction unit including a frequency vector calculator for calculating frequencies of characteristic symbols within the facial characters and extracting frequency vectors, and a normalization processor for normalizing the frequency vectors, and a reading selection unit for selecting and outputting readings for typical vectors most similar to the extracted frequency vectors, using a vector reading table.

4. The text to speech synthesizer of claim 3, wherein the facial character reading assignment unit decides upon readings for facial characters using the step of:

(a) scanning the text and detecting a left outline symbol and right outline symbol, (b) extracting characteristics symbols used in facial characters from character strings encompassed by the left outline symbol and the right outline symbol, (c) extracting and normalizing the frequency vectors, the frequency vectors indicating numbers of appearances of the characteristic symbols, (d) selecting typical vectors most similar to the normalized frequency vectors, and (e) taking readings allotted to the typical vectors as facial character readings.

5. A text to speech synthesizer, comprising:

a text analyzer for analyzing text data;

a facial character reading assignment unit for assigning facial character readings to character string portions of text analysis results determined to correspond to facial characters; and a speech synthesizer for outputting synthesized speech based on the analysis results of the text analyzer, wherein the facial character reading assignment unit includes a facial character determining unit for determining whether or not a symbol is a symbol constituting a facial character, using an outline symbol table that is lined up based on similarities between shape characteristics, a characteristic extraction unit for extracting characteristic symbols used in facial characters using a characteristic symbol table from character strings determined to be facial characters, said characteristic extraction unit including a frequency vector calculator for calculating the frequency of characteristic symbols within the facial characters and extracting frequency vectors and a normalization processor for normalizing frequency vectors, and a reading selection unit for selecting and outputting readings for typical vectors most similar to the extracted frequency vectors, using a vector reading table.

6. The text to speech synthesizer of claim 5, wherein the facial character reading assignment unit decides upon readings for facial characters using the steps of:

(a) scanning the text and detecting a left outline symbol and right outline symbol, (b) extracting characteristic symbols used in facial characters from character strings encompassed by the left outline symbol and the right outline symbol, (c) extracting the frequency vectors, the frequency vectors indicating numbers of appearances of the characteristic symbols, filtering processing the frequency vectors and normalizing the frequency vectors after the filtering processing, (d) selecting typical vectors most similar to the normalized frequency vectors, and (e) taking readings allotted to the typical vectors as facial character readings.

* * * * *